United States Patent
Sun et al.

(10) Patent No.: US 12,228,784 B2
(45) Date of Patent: Feb. 18, 2025

(54) PROTECTIVE ASSEMBLY AND IMAGING EQUIPMENT SET

(71) Applicant: NATIONAL TAIWAN UNIVERSITY, Taipei (TW)

(72) Inventors: Chi-Kuang Sun, Taipei (TW); Pei-Jhe Wu, Taipei (TW); Ying-Ting Huang, Taipei (TW); Hsiao-Chieh Tseng, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 572 days.

(21) Appl. No.: 17/563,313

(22) Filed: Dec. 28, 2021

(65) Prior Publication Data

US 2023/0094096 A1 Mar. 30, 2023

(30) Foreign Application Priority Data

Sep. 24, 2021 (TW) ................................. 110135484

(51) Int. Cl.
*G02B 7/02* (2021.01)

(52) U.S. Cl.
CPC ....................... *G02B 7/02* (2013.01)

(58) Field of Classification Search
CPC ...... G02B 7/02; G02B 7/023; G02B 27/0006; G02B 21/02; G02B 21/33; G02B 7/028;
(Continued)

(56) References Cited

U.S. PATENT DOCUMENTS

| 4,208,101 A | * | 6/1980 | Trapp | ........................ G02B 1/06 |
| | | | | 359/656 |
| 4,682,859 A | * | 7/1987 | Togino | ............... G02B 27/0068 |
| | | | | 359/656 |

(Continued)

FOREIGN PATENT DOCUMENTS

| CN | 211481365 U | | 9/2020 |
| CN | 213189478 U | * | 5/2021 |

(Continued)

OTHER PUBLICATIONS

3M Science Why Medical Tape Matters: The surprising role tapes play in patient outcomes and experiences, pp. 4-5 (Year: 2019).*

(Continued)

*Primary Examiner* — Jie Lei
(74) *Attorney, Agent, or Firm* — Li & Cai Intellectual Property (USA) Office

(57) ABSTRACT

A protective assembly and an imaging equipment set are provided. The protective assembly is used to accommodate an imaging lens, and includes a housing, a transparent partition, and an adhesive member. The housing includes a tube body segment and a bottom segment that is connected to the tube body segment. A curved portion is formed on a periphery of the bottom segment, and an accommodating space is defined by the housing. The imaging lens is movably disposed in the accommodating space. An inner side of the curved portion has an inclined surface that is configured to abut against a shell of the imaging lens. The transparent partition is disposed on the bottom segment of the housing. The adhesive member has an outer surface that is sticky and an inner surface that is fixed onto a bottom surface of the housing.

9 Claims, 8 Drawing Sheets

(58) Field of Classification Search
CPC .... G02B 27/00; G02B 27/0068; G02B 21/36; G02B 21/006; G02B 21/0028; G02B 21/008; G02B 3/04; G02B 1/06; G02B 1/14; G02B 1/18; G03B 17/08; A61B 5/0077
USPC ....... 359/808, 894, 895, 656, 823, 665, 661, 359/643; 396/448, 529, 530, 535
See application file for complete search history.

(56) References Cited

U.S. PATENT DOCUMENTS

| | | | | |
|---|---|---|---|---|
| 4,953,962 | A * | 9/1990 | Esswein | G02B 27/0068 359/368 |
| 5,719,700 | A * | 2/1998 | Corcuff | A61B 5/0068 359/383 |
| 2007/0206275 | A1 | 9/2007 | Hemmer et al. | |
| 2009/0211586 | A1* | 8/2009 | Shea | A61B 46/10 128/849 |
| 2017/0261860 | A1 | 9/2017 | Pilz et al. | |
| 2018/0335505 | A1 | 11/2018 | Bretagnol et al. | |
| 2021/0240057 | A1 | 8/2021 | Kondo et al. | |
| 2023/0314915 | A1* | 10/2023 | Houjou | G03B 15/14 396/448 |

FOREIGN PATENT DOCUMENTS

| | | | | |
|---|---|---|---|---|
| CN | 214151342 U | | 9/2021 | |
| EP | 2163929 A1 * | | 3/2010 | ......... G01N 21/9501 |
| EP | 3404482 A1 | | 11/2018 | |
| JP | 2002148518 A | | 5/2002 | |
| TW | M555952 U | | 2/2018 | |
| WO | WO 2022050084 A1 | | 3/2022 | |

OTHER PUBLICATIONS

Machine Translation of CN213189478 (Year: 2024).*
Liao Yihua, "Non-invasive deep skin pathology imaging technology Taiwan University National Innovation Award", Institute for Biotechnology and Medicine Industry (I.B.I.M), YouTube, Jun. 2, 2022,https://www.youtube.com/watch?v=9GcmEiUZxYQ.

* cited by examiner

PROTECTIVE ASSEMBLY AND IMAGING EQUIPMENT SET

CROSS-REFERENCE TO RELATED PATENT APPLICATION

This application claims the benefit of priority to Taiwan Patent Application No. 110135484, filed on Sep. 24, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a protective assembly and an imaging equipment set, and more particularly to a protective assembly that is adapted to an optical imaging device and an imaging equipment set that includes the protective assembly.

BACKGROUND OF THE DISCLOSURE

When human subject research is carried out with use of an optical imaging device, since shaking caused by personal factors (such as breathing or heart beating) is unavoidable, a vacuum pump mechanism has been adopted in the related art for stabilizing an optical imaging lens. However, when a user has to move the optical imaging lens to other areas to be examined, vacuuming needs to be performed again, so that the optical imaging lens can be fixed to one of the areas to be examined. Such a process is time-consuming and labor-intensive.

Therefore, how to solve repeated fixing issues of the optical imaging device through an improvement in structural design, so as to overcome the above-mentioned problem, has become one of the important issues to be addressed in this industry.

SUMMARY OF THE DISCLOSURE

In response to the above-referenced technical inadequacy, the present disclosure provides a protective assembly and an imaging equipment set, so as to effectively overcome a shaking problem caused by unavoidable personal factors. Not only can an optical imaging device be effectively fixed to one of areas to be examined (thereby improving an issue of blurred images), but the area to be examined can also be quickly changed when needed (with a clear image obtained).

In one aspect, the present disclosure provides a protective assembly that is used to accommodate an imaging lens. The protective assembly includes a housing, a transparent partition, and an adhesive member. The housing includes a tube body segment and a bottom segment that is connected to the tube body segment. The bottom segment has a curved portion that is formed on a periphery thereof. An accommodating space is defined by the housing and the imaging lens is movably disposed in the accommodating space. An inner side of the curved portion has an inclined surface that is configured to abut against a shell of the imaging lens. The transparent partition is disposed on the bottom segment of the housing. The adhesive member has an inner surface and an outer surface. The inner surface of the adhesive member is fixed onto a bottom surface of the housing, and the outer surface of the adhesive member is sticky.

In certain embodiments, an outer side of the curved portion has a curved surface or has a right angle.

In certain embodiments, the bottom segment has a through hole, and the transparent partition is disposed in the through hole.

In certain embodiments, an area of the through hole is larger than an area of the imaging lens.

In certain embodiments, the adhesive member is detachably and replaceably fixed to the bottom segment, the transparent partition is detachably and replaceably disposed on the bottom segment, and the outer surface of the adhesive member is flush with a bottom surface of the transparent partition.

In certain embodiments, the adhesive member is a medical double-sided tape or a gel sheet.

In certain embodiments, the bottom segment of the housing is detachably connected to the tube body segment. The tube body segment further includes a first connection part, and the curved portion includes a second connection part. The first connection part and the second connection part are engaged with each other.

In certain embodiments, the adhesive member includes at least one engaging structure, a carrier layer, and a gel layer. The gel layer is disposed on a bottom side of the carrier layer. The at least one engaging structure is disposed on a top side of the carrier layer, so as to be engaged with the housing.

In certain embodiments, the bottom segment further includes at least one engaging groove that is engaged to the at least one engaging structure.

In another aspect, the present disclosure provides an imaging equipment set that includes an imaging lens and the above-mentioned protective assembly. The imaging lens is disposed in the accommodating space of the protective assembly.

Therefore, in the protective assembly and the imaging equipment set provided by the present disclosure, the inner side of the curved portion of the bottom segment of the housing has the inclined surface that is configured to abut against the shell of the imaging lens. The bottom segment of the housing has the through hole, and the area of the through hole is larger than the area of the imaging lens. Accordingly, through the through hole, the imaging lens can observe one area to be examined. Since the inclined surface is configured to abut against the shell of the imaging lens, the imaging lens can have a largest moving space in the housing, such that the imaging lens is able to move in a small range when observing the area to be examined. In addition, the adhesive member fixed onto the bottom surface of the housing is sticky and can be quickly attached to the to-be-examined area of a human body, so as to prevent the housing from directly contacting the human skin and to obtain clear images. Furthermore, after the observation, the adhesive member can be quickly replaced by a new adhesive member, and the sanitary condition of one-time use is achieved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
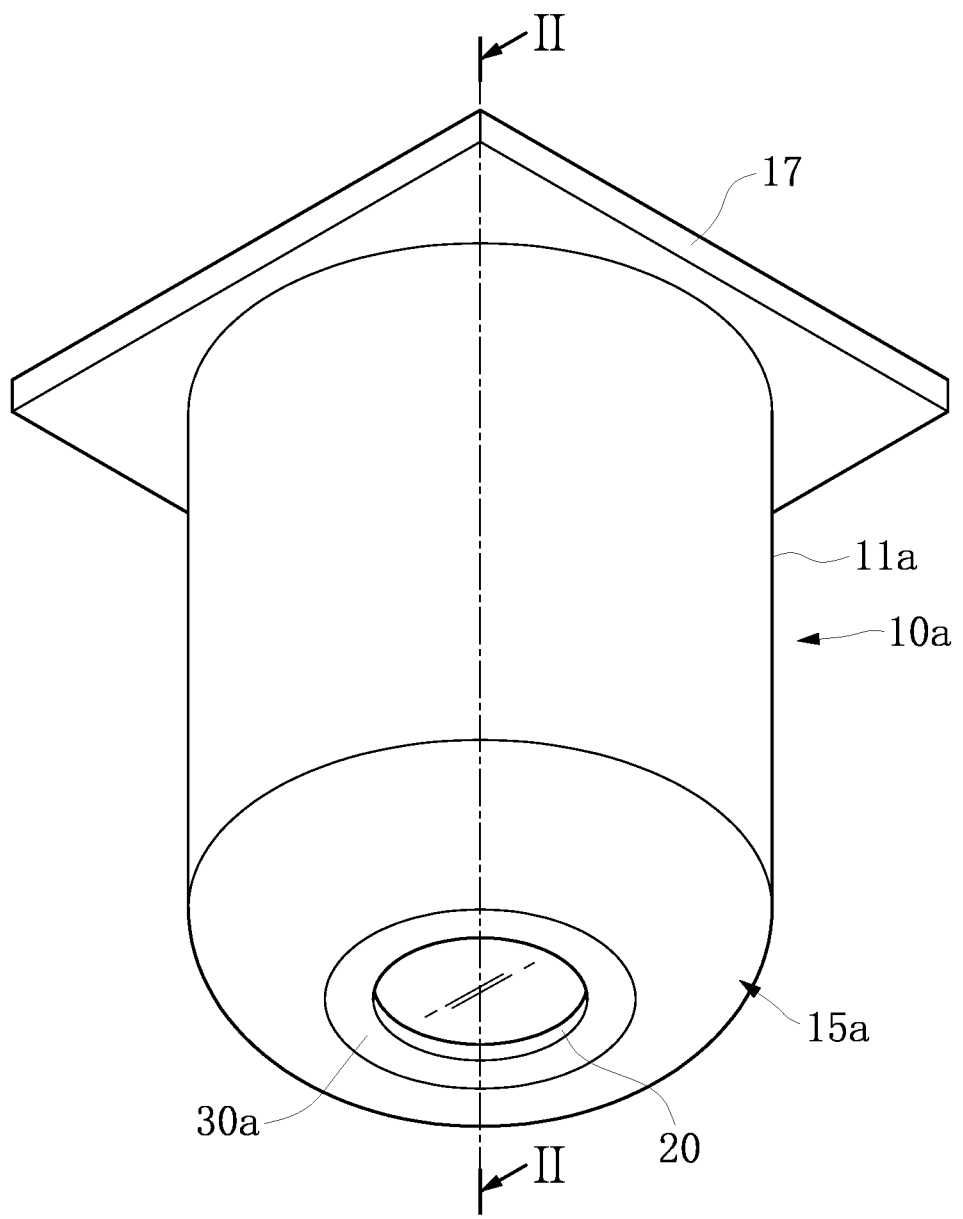
FIG. 1 is a perspective view of a protective assembly according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 4, a first embodiment of the present disclosure provides a protective assembly 700 that is used to accommodate an imaging lens 500. The imaging lens 500 can be a water immersion objective lens or a normal objective lens. The imaging lens 500 includes an objective lens part 501 that can have a circular cylindrical shape or a circular conical shape. A periphery of the objective lens part 501 has an inclined surface. The protective assembly 700 includes a housing 10a, a transparent partition 20, and an adhesive member 30a. An accommodating space 19 that is used to accommodate the imaging lens 500 is defined by the housing 10a. The accommodating space 19 is configured to allow the imaging lens 500 to be movably arranged therein. The housing 10a can be filled with a liquid. The liquid in the present embodiment can be water for enabling the imaging lens 500 to operate, but the liquid is not limited thereto. The housing 10a includes a tube body segment 11a, a bottom segment 15a, and a locking part 17. Two ends of the tube body segment 11a are respectively connected to the bottom segment 15a and the locking part 17. The tube body segment 11a, the bottom segment 15a, and the locking part 17 can be formed as a one-piece structure. The tube body segment 11a, the bottom segment 15a, and the locking part 17 can also be threadedly engaged to each other or can be fastened to each other. In this embodiment, the protective assembly 700 is formed as a one-piece structure (as shown in FIG. 5), but the present disclosure is not limited thereto. The locking part 17 can be connected to a shell (not shown in the figures) of the imaging lens 500, so that the housing 10a can be fixed onto the shell of the imaging lens 500. The locking part 17 and the shell of the imaging lens 500 can be threadedly engaged to each other or can be fastened to each other, but the present disclosure is not limited thereto.

A curved portion 151 is formed on a periphery of the bottom segment 15a, and an inner side of the curved portion 151 has an inclined surface 1551. The inclined surface 1551 is configured to abut against a lens cone of the imaging lens 500. Therefore, the imaging lens 500 can have a largest moving space in the accommodating space 19. In addition, the inclined surface 1551 can also allow water in the accommodating space 19 to converge, such that the water can be collected between the imaging lens 500 and the transparent partition 20.

Figure 2:
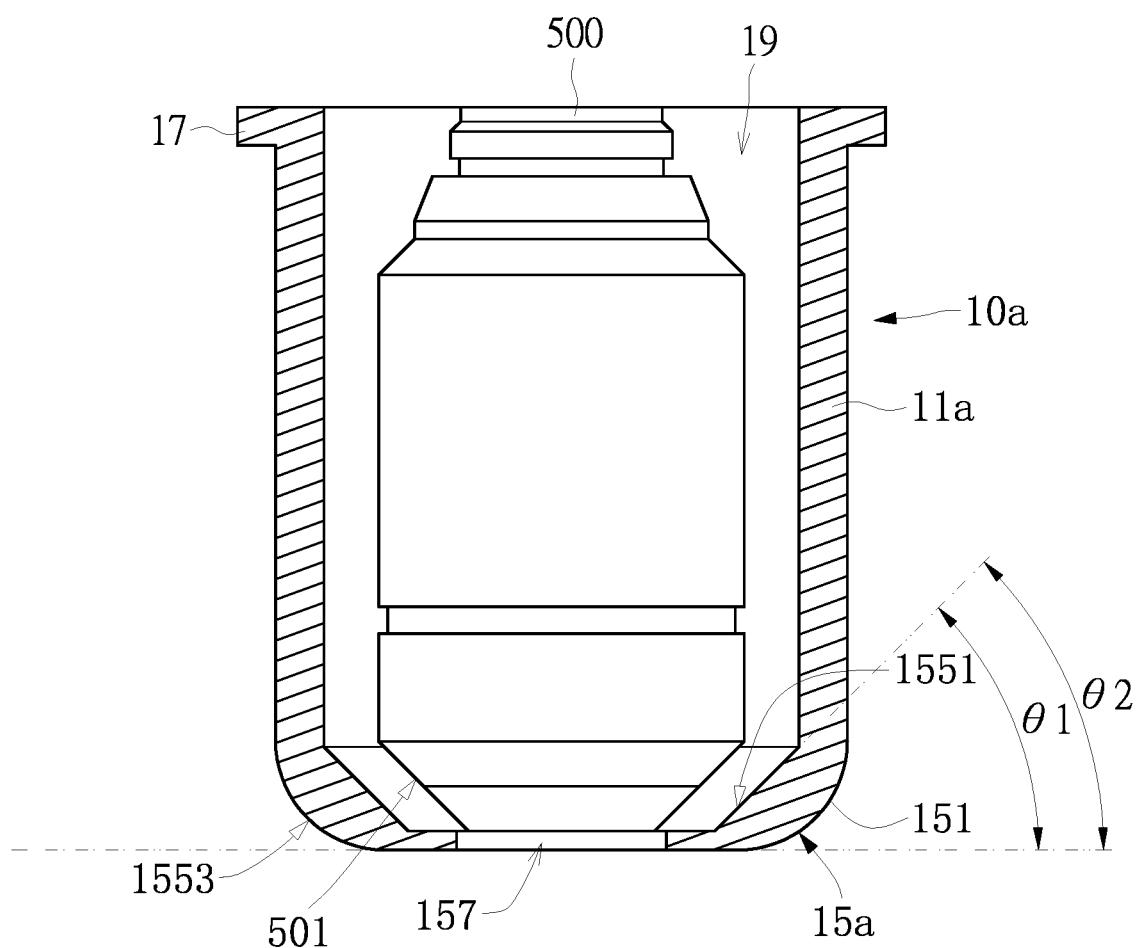
FIG. 2 is a partially cross-sectional view taken along line II-II of FIG. 1.
Figure 4:
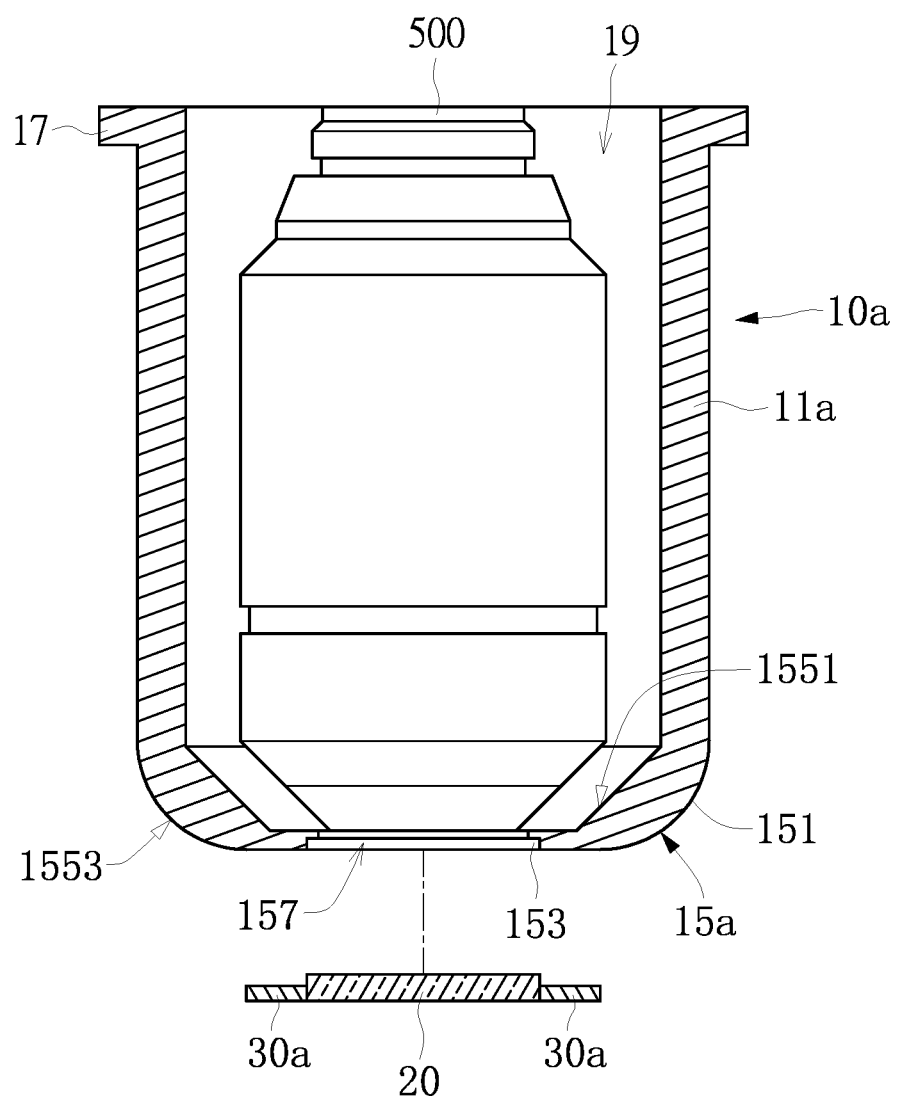
FIG. 4 is an exploded view of the protective assembly according to the first embodiment of the present disclosure.
Figure 5:
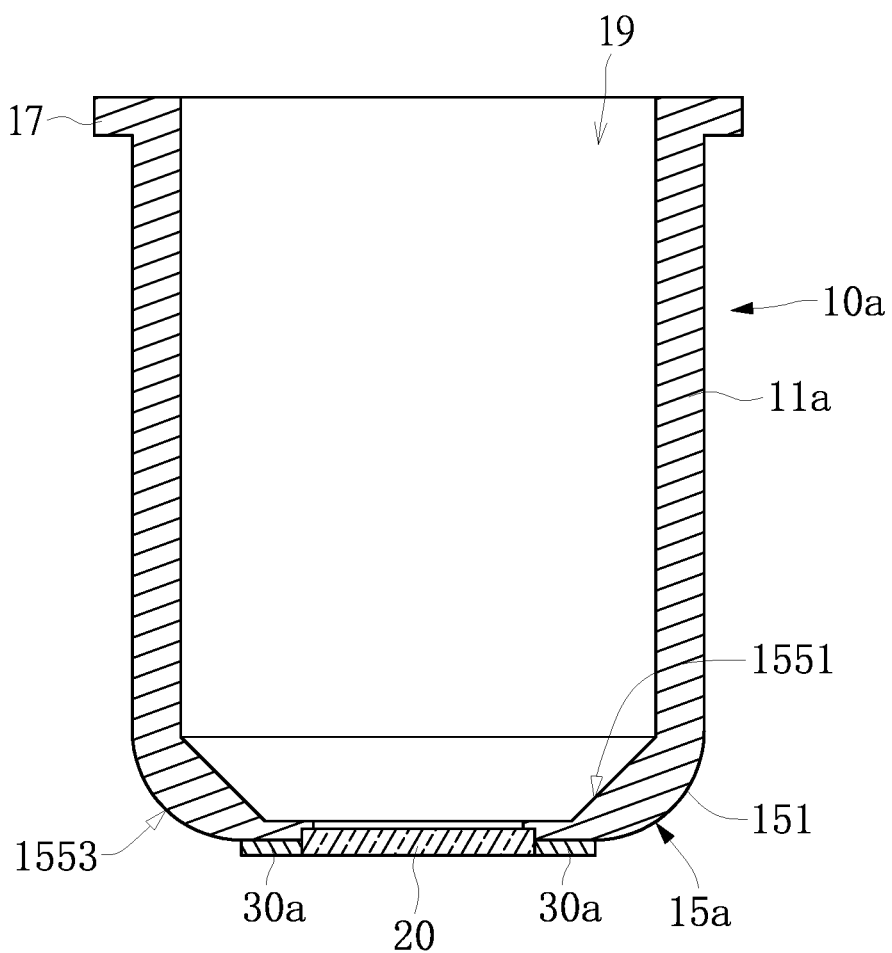
FIG. 5 is a sectional view of a housing according to the first embodiment of the present disclosure.

The bottom segment 15a has a stepped groove 153 (as shown in FIG. 4. The stepped groove 153 is provided at a position near a central axis of the bottom segment 15a. A through hole 157 is defined by the stepped groove 153 (as shown in FIG. 2). The transparent partition 20 is detachably and replaceably disposed in the through hole 157 and tightly engages with the through hole 157, so as to ensure that the water does not leak from the accommodating space 19. Both the size and the thickness of the stepped groove 153 are defined by the transparent partition 20. The size and the thickness of the stepped groove 153 are not limited in the present disclosure. An area of the through hole 157 is larger than an area of the imaging lens 500. Accordingly, the imaging lens 500 that is movably disposed in the accommodating space 19 is able to observe one area to be examined through the through hole 157 and to move in a small range. A movement direction of the imaging lens 500 is perpendicular to a central axis of the housing 10a. The imaging lens 500 can optionally contact the transparent partition 20 that is located at the bottom segment 15a. In this embodiment, the imaging lens 500 is not in contact with the transparent partition 20 that is located at the bottom segment 15a.

A slope $\theta 1$ of the inclined surface 1551 is an angle between the inclined surface 1551 and a horizontally extending surface of a bottom surface of the bottom segment 15a. A slope $\theta 2$ of the objective lens part 501 is an angle between the inclined surface of the objective lens part 501 and the horizontally extending surface of the bottom surface of the bottom segment 15a. The slope $\theta 1$ of the inclined surface 1551 can be adjusted according to the slope $\theta 2$ of the objective lens part 501 of the imaging lens 500. The slope $\theta 1$ of the inclined surface 1551 ranges from 0° to 41°, and the slope θ2 of the objective lens part 501 also ranges from 0° to 41°. The slope θ1 of the inclined surface 1551 and the slope θ2 of the objective lens part 501 can be the same. In this embodiment, both the slope θ1 of the inclined surface 1551 and the slope θ2 of the objective lens part 501 are 41° (as shown in FIG. 2).

Figure 3:
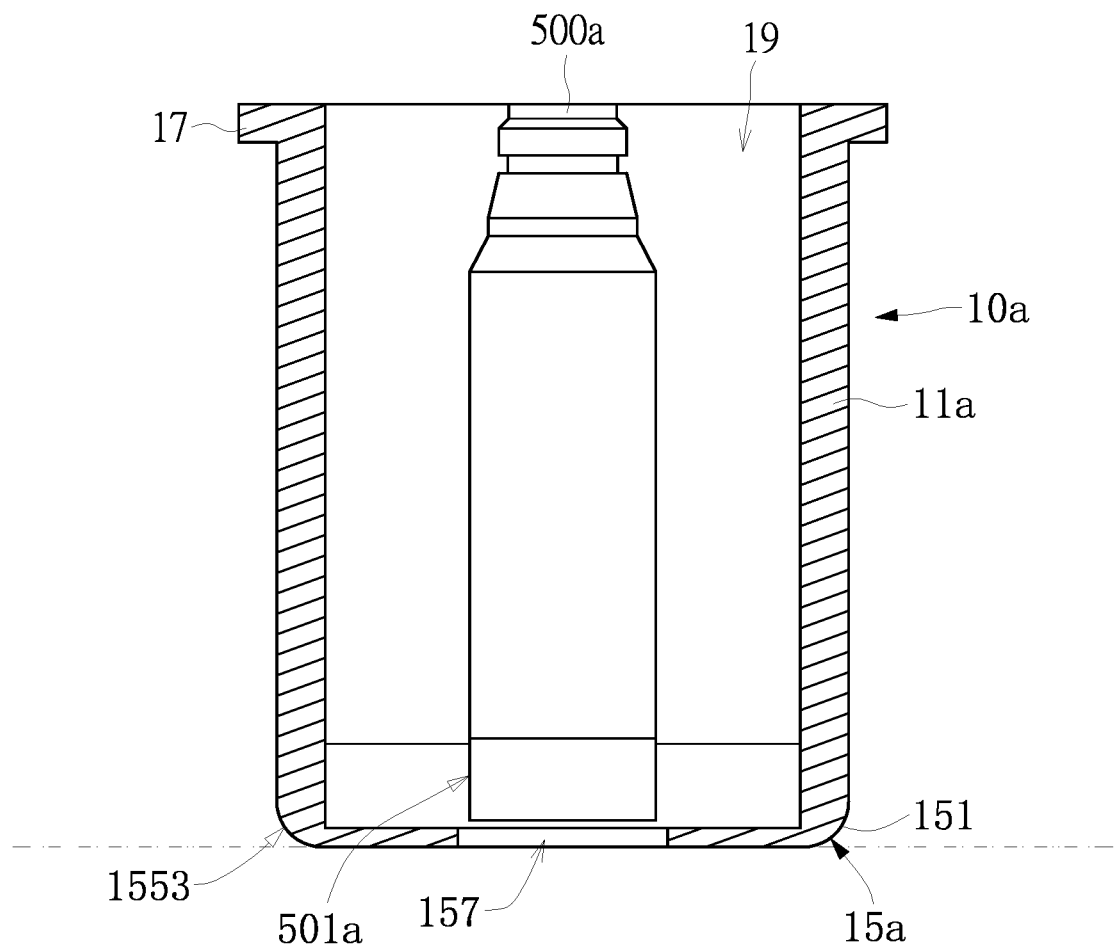
FIG. 3 is a schematic cross-sectional view showing an inclined surface of a bottom segment having a slope of 0 degrees according to the present disclosure.

Referring to FIG. 3, under the condition that both the slope θ1 of the inclined surface 1551 and the slope θ2 of the objective lens part 501 are 0°, an objective lens part 501a of an imaging lens 500a is configured to abut against an inside of the housing 10a. Accordingly, the imaging lens 500 that is movably disposed in the accommodating space 19 is able to observe one area to be examined through the through hole 157 and to move in a small range. A movement direction of the imaging lens 500a is perpendicular to the central axis of the housing 10a.

An outer side of the curved portion 151 is a curved surface 1553, so that the housing 10a can effectively contact the area to be examined. For example, the curved surface 1553 is suitable for a to-be-examined skin area of a human body with an uneven surface. Since a radian of the curved surface 1553 is not limited in the present disclosure, the curved surface 1553 can also have a right angle.

The transparent partition 20 can be a cover glass or a slide glass. The transparent partition 20 is sheet-shaped. The shape of the transparent partition 20 can be round, square, or polygonal. Both the shape and the thickness of the transparent partition 20 can be adjusted according to actual requirements, and are not limited thereto. An image quality of the imaging lens 500 will not be affected by optical properties of the transparent partition 20. The transparent partition 20 can be a circular cover glass in this embodiment. The imaging lens 500 is configured to observe the to-be-examined area through the transparent partition 20, so that the imaging lens 500 is prevented from directly contacting the to-be-examined area.

The adhesive member 30a can be a medical double-sided tape or a gel sheet. The adhesive member 30a has an outer surface and an inner surface. Both the outer surface and the inner surface of the adhesive member 30a can be sticky. A material of the adhesive member 30a is not limited in the present disclosure. The inner surface of the adhesive member 30a is fixed on a bottom surface of the housing 10a. The adhesive member 30a is detachably and replaceably connected to an outer surface of the bottom segment 15a of the housing 10a. The outer surface of the adhesive member 30a can be flush with a bottom surface of the transparent partition 20 that is located in the through hole 157 (as shown in FIG. 5). The medical double-sided tape meets biocompatibility tests, such as a cytotoxicity test, a skin sensitivity test, and a skin irritation test.

Since a second embodiment is similar to the first embodiment, the similarities therebetween (such as the curved portion 151, the inclined surface 1551, the stepped groove 153, and the transparent partition 20) will not be repeated herein.

Figure 6:
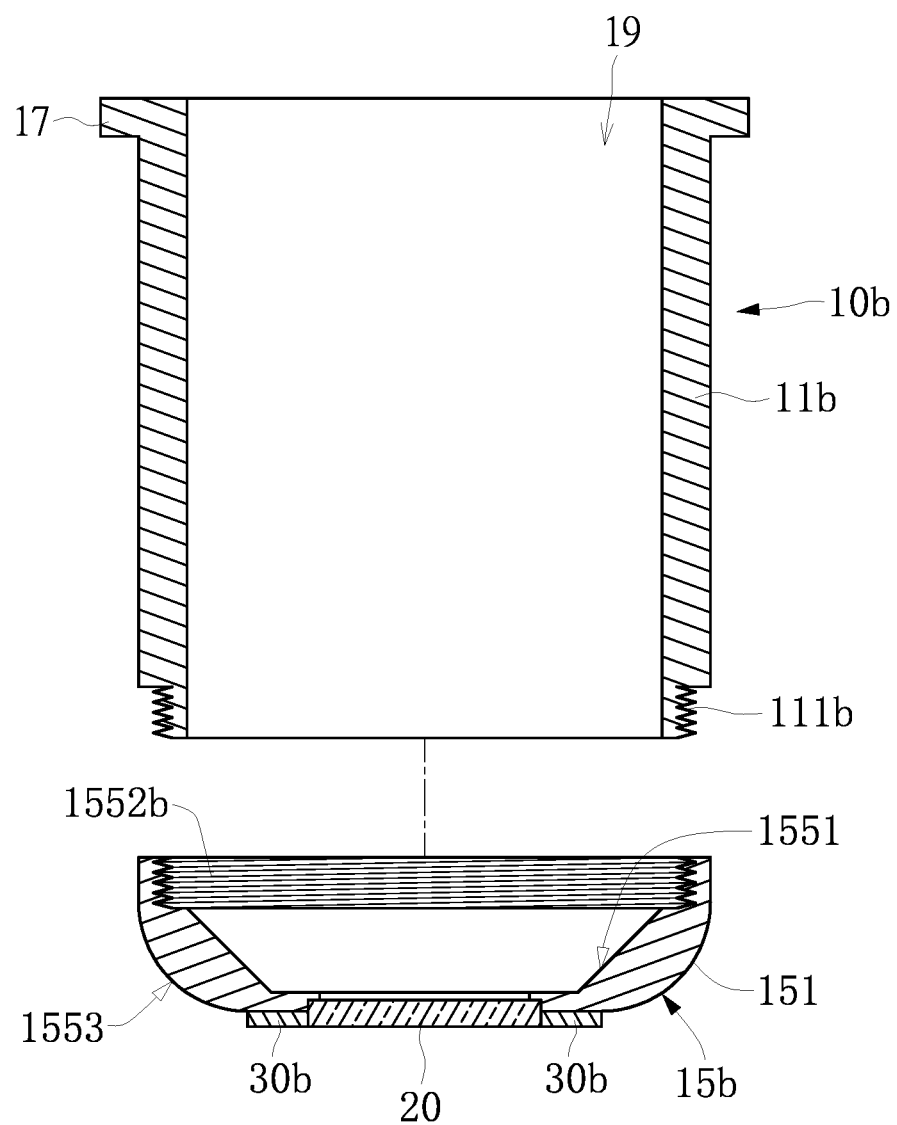
FIG. 6 is a sectional view of a housing according to a second embodiment of the present disclosure.

Referring to FIG. 6, the second embodiment of the present disclosure provides a protective assembly 700 that includes a housing 10b, the transparent partition 20, and an adhesive member 30b. The housing 10b includes a tube body segment 11b, a bottom segment 15b, and a locking part 17. One end of the tube body segment 11b is connected to the locking part 17. The tube body segment 11b and the locking part 17 can be formed as a one-piece structure. The tube body segment 11b and the locking part 17 can also be threadedly engaged to each other or can be fastened to each other. In this embodiment, the protective assembly 700 is formed as a one-piece structure, but the present disclosure is not limited thereto. Another end of the tube body segment 11b includes a first connection part 111b, and the bottom segment 15b includes a second connection part 1552b. The first connection part 111b is configured to be connected to the second connection part 1552b. The bottom segment 15b is detachably connected to the tube body segment 11b. The locking part 17 can be connected to the shell (not shown in the figures) of the imaging lens 500, so that the housing 10b can be fixed onto the shell of the imaging lens 500. Since the first connection part 111b and the second connection part 1552b can be connected to each other, a quick replacement and the sanitary condition of one-time use can both be achieved through a user replacing the second connection part 1552b.

The adhesive member 30b can be a medical double-sided tape or a gel sheet. The adhesive member 30b has an outer surface and an inner surface. Both the outer surface and the inner surface of the adhesive member 30b can be sticky. A material of the adhesive member 30b is not limited in the present disclosure. The inner surface of the adhesive member 30b is fixed on a bottom surface of the housing 10b. The adhesive member 30b is detachably and replaceably connected to an outer surface of the bottom segment 15b of the housing 10b. The outer surface of the adhesive member 30b can be flush with the bottom surface of the transparent partition 20 that is located in the through hole 157.

Since a third embodiment is similar to the first embodiment, the similarities therebetween (such as the curved portion 151, the inclined surface 1551, the stepped groove 153, and the transparent partition 20) will not be repeated herein.

Figure 7:
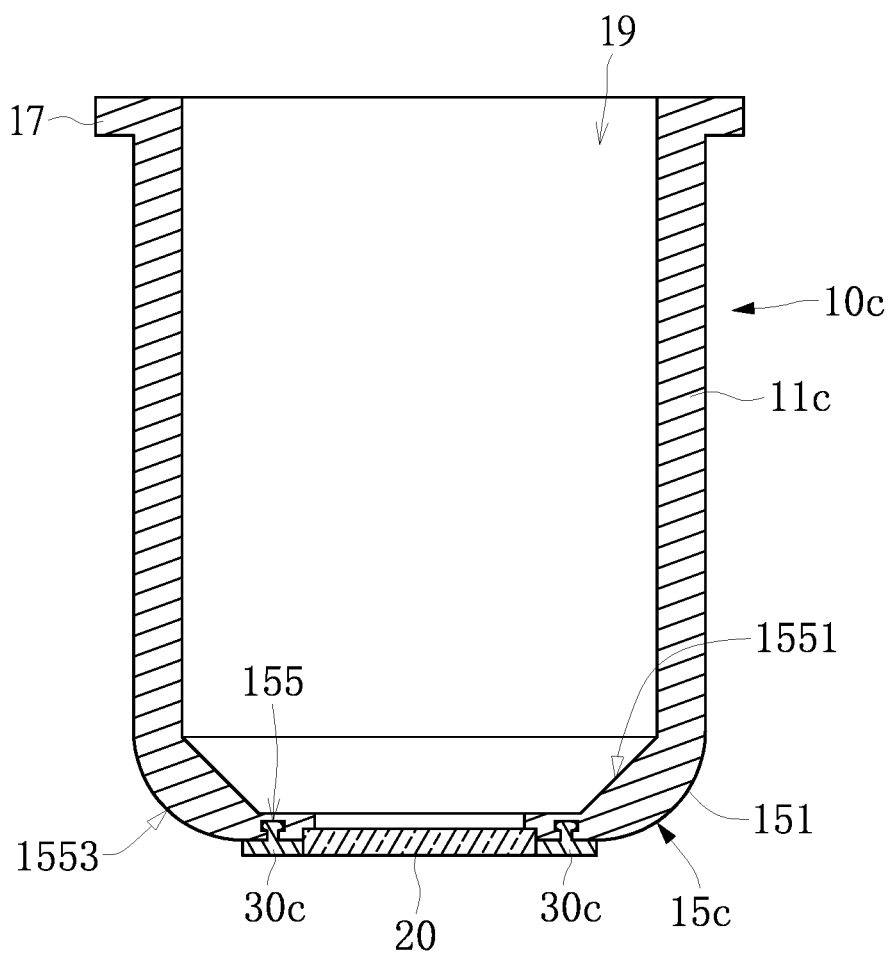
FIG. 7 is a sectional view of a housing according to a third embodiment of the present disclosure.
Figure 8:
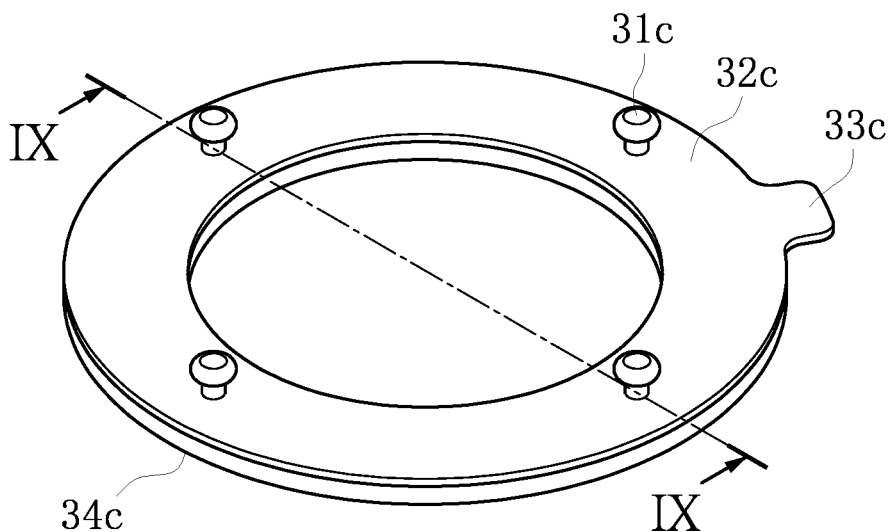
FIG. 8 is a perspective view of a transparent partition according to the present disclosure.
Figure 9:
FIG. 9 is a partially cross-sectional view taken along line IX-IX of FIG. 8.

Referring to FIG. 7 to FIG. 9, the third embodiment of the present disclosure provides a protective assembly 700 that includes a housing 10c, the transparent partition 20, and an adhesive member 30c. The accommodating space 19 that is used to accommodate the imaging lens 500 (not shown in the figures) is defined by the housing 10c. The accommodating space 19 is configured to allow the imaging lens 500 to be movably arranged therein. The housing 10c can be filled with the liquid. The housing 10c includes a tube body segment 11c, a bottom segment 15c, and the locking part 17. Two ends of the tube body segment 11c are respectively connected to the bottom segment 15c and the locking part 17. The tube body segment 11c, the bottom segment 15c, and the locking part 17 can be formed as a one-piece structure. The tube body segment 11c, the bottom segment 15c, and the locking part 17 can also be threadedly engaged to each other or can be fastened to each other. In this embodiment, the protective assembly 700 is formed as a one-piece structure (as shown in FIG. 7), but the present disclosure is not limited thereto. The locking part 17 can be connected to the shell (not shown in the figures) of the imaging lens 500, so that the housing 10c can be fixed onto the shell of the imaging lens 500. The locking part 17 and the shell of the imaging lens 500 can be threadedly engaged to each other or can be fastened to each other, but the present disclosure is not limited thereto.

The bottom segment 15c of the housing 10c includes at least one engaging groove 155. Both the number and the shape of the engaging groove 155 are not limited in the present disclosure. In this embodiment, the housing 10c includes four engaging grooves 155 that are configured to engage with engaging structures 31c.

Referring to FIG. 8, the adhesive member 30c includes at least one engaging structure 31c, a carrier layer 32c, a holding member 33c, and a gel layer 34c. Both the number and the shape of the engaging structure 31c are not limited in the present disclosure. In this embodiment, the adhesive member 30c includes four engaging structures 31c. The engaging structures 31c are disposed on a top side of the carrier layer 32c, so as to be engaged with the housing 10c. The gel layer 34c is disposed on a bottom side of the carrier layer 32c, so as to be attached to the area to be examined on the human skin. The holding member 33c is connected to the carrier layer 32c. The holding member 33c can be used to assist the user in replacing the adhesive member 30c, such that the adhesive member 30c can be quickly replaced at the bottom segment 15c of the housing 10c and the sanitary condition of one-time use can be achieved.

An outer surface of the adhesive member 30c can be flush with the bottom surface of the transparent partition 20 that is located in the through hole 157.

[Beneficial Effects of the Embodiments]

In conclusion, one of the advantages of the subject matter provided by the present disclosure is that in the protective assembly and the imaging equipment set provided by the present disclosure, the inner side of the curved portion of the bottom segment of the housing has the inclined surface that is configured to abut against the shell of the imaging lens. The bottom segment of the housing has the through hole, and the area of the through hole is larger than the area of the imaging lens. Accordingly, through the through hole, the imaging lens can observe one area to be examined. Since the inclined surface is configured to abut against the shell of the imaging lens, the imaging lens can have a largest moving space in the housing, such that the imaging lens is able to move in a small range when observing the area to be examined. In addition, the adhesive member fixed onto the bottom surface of the housing is sticky and can be quickly attached to the to-be-examined area of a human body, so as to prevent the housing from directly contacting the human skin and to obtain clear images. Furthermore, after the observation, the adhesive member can be quickly replaced by a new adhesive member, and the sanitary condition of one-time use is achieved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A protective assembly for accommodating an imaging lens, the protective assembly comprising:
    a housing including a tube body segment and a bottom segment that is connected to the tube body segment, wherein the bottom segment has a curved portion formed on a periphery thereof, and an accommodating space is defined by the housing to receive a liquid therein for enabling the imaging lens to operate,
    wherein the imaging lens is movably disposed in the accommodating space, and an inner side of the curved portion has an inclined surface that is configured to abut against a shell of the imaging lens,
    wherein the bottom segment has a stepped groove, and a through hole is defined by the stepped groove formed through the bottom segment;
    a transparent partition disposed on the bottom segment of the housing and tightly engaged within the through hole; and
    an adhesive member having an inner surface and an outer surface, wherein the inner surface of the adhesive member is fixed onto a bottom surface of the housing, and the outer surface of the adhesive member is sticky, wherein the outer surface of the adhesive member is flush with a bottom surface of the transparent partition, so that the adhesive member laterally surrounds the transparent partition.

2. The protective assembly according to claim 1, wherein an outer side of the curved portion has a curved surface or has a right angle.

3. The protective assembly according to claim 1, wherein an area of the through hole is larger than an area of the imaging lens.

4. The protective assembly according to claim 1, wherein the adhesive member is detachably and replaceably fixed to the bottom segment, the transparent partition is detachably and replaceably disposed on the bottom segment.

5. The protective assembly according to claim 1, wherein the adhesive member is a medical double-sided tape or a gel sheet.

6. The protective assembly according to claim 1, wherein the bottom segment of the housing is detachably connected to the tube body segment, the tube body segment further includes a first connection part, and the curved portion includes a second connection part, and wherein the first connection part and the second connection part are engaged with each other.

7. The protective assembly according to claim 1, wherein the adhesive member includes at least one engaging structure, a carrier layer, and a gel layer, and wherein the gel layer is disposed on a bottom side of the carrier layer, and the at least one engaging structure is disposed on a top side of the carrier layer, so as to be engaged with the housing.

8. The protective assembly according to claim 7, wherein the bottom segment further includes at least one engaging groove that is engaged to the at least one engaging structure of the adhesive member.

9. An imaging equipment set, comprising:
    an imaging lens; and
    the protective assembly as claimed in claim 1, wherein the imaging lens is disposed in the accommodating space of the protective assembly.

\* \* \* \* \*